US010882372B2

(12) United States Patent
Raffaelli

(10) Patent No.: US 10,882,372 B2
(45) Date of Patent: Jan. 5, 2021

(54) FORECARRIAGE OF A ROLLING MOTOR VEHICLE

(71) Applicant: PIAGGIO & C. S.p.A., Pisa (IT)

(72) Inventor: Andrea Raffaelli, Pisa (IT)

(73) Assignee: PIAGGIO & C. S.P.A., Pisa (IT)

(*) Notice: Subject to any disclaimer, the term of this patent is extended or adjusted under 35 U.S.C. 154(b) by 248 days.

(21) Appl. No.: 16/065,994

(22) PCT Filed: Dec. 28, 2016

(86) PCT No.: PCT/IB2016/058047
§ 371 (c)(1),
(2) Date: Jun. 25, 2018

(87) PCT Pub. No.: WO2017/115296
PCT Pub. Date: Jul. 6, 2017

(65) Prior Publication Data
US 2019/0009630 A1 Jan. 10, 2019

(30) Foreign Application Priority Data
Dec. 28, 2015 (IT) .......................... 102015000088097

(51) Int. Cl.
*B60G 17/005* (2006.01)
*B62K 5/01* (2013.01)
(Continued)

(52) U.S. Cl.
CPC .......... *B60G 17/005* (2013.01); *B60G 21/05* (2013.01); *B62D 9/02* (2013.01); *B62D 9/04* (2013.01);
(Continued)

(58) Field of Classification Search
CPC . B62K 5/01; B62K 5/027; B62K 5/05; B62K 5/08; B62K 5/10; B62K 2005/001;
(Continued)

(56) References Cited

U.S. PATENT DOCUMENTS

| 7,264,251 B2* | 9/2007 | Marcacci | B60G 17/0152 280/124.103 |
| 8,141,890 B2* | 3/2012 | Hughes | B62K 5/027 280/124.103 |

(Continued)

FOREIGN PATENT DOCUMENTS

| DE | 20104600 UI | 8/2001 |
| DE | 102008008731 A1 | 8/2009 |

(Continued)

OTHER PUBLICATIONS

International Search Report PCT/IB2016/058047 dated Apr. 12, 2017.

*Primary Examiner* — Laura Freedman
(74) *Attorney, Agent, or Firm* — Arent Fox LLP; Michael Fainberg

(57) ABSTRACT

Disclosed is a forecarriage of a rolling motor vehicle with three or four wheels, comprising: —a forecarriage frame; —at least a pair of front wheels kinematically connected one to each other and to the forecarriage frame by means of a first kinematic mechanism which enables the front wheels to roll in a synchronous and specular manner, each wheel being connected to said rolling kinematic mechanism by means of a respective axle journal, the latter being mechanically connected to a rotation pin of the wheel in order to support it rotatably around an axis of rotation; —means of suspension which provide each axle journal at least one spring suspension movement with respect to said rolling kinematic mechanism; —a steering device which kinematically connects the axle journals to each other so as to command the rotation of the axle journals around respective steering axes of each front wheel.

23 Claims, 7 Drawing Sheets

(51) Int. Cl.
    *B62K 5/027*         (2013.01)
    *B62K 5/08*          (2006.01)
    *B62K 5/10*          (2013.01)
    *B62K 25/08*        (2006.01)
    *B60G 21/05*        (2006.01)
    *B62K 5/05*          (2013.01)
    *B62D 9/02*          (2006.01)
    *B62D 9/04*          (2006.01)
    *B62K 25/04*        (2006.01)
    *B62K 5/00*          (2013.01)

(52) U.S. Cl.
    CPC ............... *B62K 5/01* (2013.01); *B62K 5/027* (2013.01); *B62K 5/05* (2013.01); *B62K 5/08* (2013.01); *B62K 5/10* (2013.01); *B62K 25/04* (2013.01); *B62K 25/08* (2013.01); *B60G 2204/46* (2013.01); *B60G 2300/122* (2013.01); *B60G 2300/124* (2013.01); *B60G 2300/45* (2013.01); *B62K 2005/001* (2013.01)

(58) Field of Classification Search
    CPC .......... B62K 25/04; B62K 25/08; B62D 9/02; B62D 9/04; B60G 21/007; B60G 21/05; B60G 2300/122; B60G 2300/124; B60G 2300/45; B60G 2800/012; B60G 17/005; B60G 2204/46; B60Y 2200/12; B60Y 2200/122
See application file for complete search history.

(56) References Cited

U.S. PATENT DOCUMENTS

| | | | | |
|---|---|---|---|---|
| 8,657,301 | B2 * | 2/2014 | Itoh | B62K 5/05 280/124.103 |
| 8,899,600 | B2 * | 12/2014 | Gaillard-Groleas | B60G 99/00 280/124.103 |
| 8,991,542 | B2 * | 3/2015 | Yu | B62K 5/027 180/209 |
| 9,211,773 | B2 * | 12/2015 | Kitamura | B62K 5/10 |
| 9,216,790 | B2 * | 12/2015 | Takano | B60G 17/005 |
| 9,238,494 | B2 * | 1/2016 | Iizuka | B62K 5/027 |
| 9,381,940 | B2 * | 7/2016 | Gale | B60G 21/073 |
| 9,731,786 | B2 * | 8/2017 | Yoshikuni | B60G 13/003 |
| 9,745,012 | B2 * | 8/2017 | Ohno | B62D 7/16 |
| 9,845,111 | B2 * | 12/2017 | Takano | B62K 5/05 |
| 10,086,900 | B2 * | 10/2018 | Hara | B62K 5/10 |
| 10,427,745 | B2 * | 10/2019 | Raffaelli | B62K 5/05 |
| 10,493,812 | B2 * | 12/2019 | Raffaelli | B62K 5/08 |
| 10,501,118 | B2 * | 12/2019 | Raffaelli | G06Q 50/06 |
| 10,583,885 | B2 * | 3/2020 | Raffaelli | B62K 5/027 |
| 10,597,078 | B2 * | 3/2020 | Suda | B60L 15/2054 |
| 2006/0151232 | A1 * | 7/2006 | Marcacci | B62K 5/05 180/414 |
| 2008/0238005 | A1 * | 10/2008 | James | B62K 5/10 280/5.509 |
| 2018/0327044 | A1 * | 11/2018 | Raffaelli | B62D 9/02 |
| 2019/0009633 | A1 * | 1/2019 | Raffaelli | B62K 5/10 |
| 2019/0232749 | A1 * | 8/2019 | Di Tanna | B62K 5/05 |
| 2019/0300095 | A1 * | 10/2019 | Raffaelli | B60G 11/10 |
| 2019/0344855 | A1 * | 11/2019 | Raffaelli | B60G 21/007 |
| 2019/0366792 | A1 * | 12/2019 | Raffaelli | B62K 5/08 |
| 2019/0367125 | A1 * | 12/2019 | Socci | B62K 25/08 |
| 2019/0375262 | A1 * | 12/2019 | Raffaelli | B62K 5/06 |
| 2019/0375476 | A1 * | 12/2019 | Raffaelli | B62K 5/10 |
| 2019/0382070 | A1 * | 12/2019 | Raffaelli | B62K 5/01 |
| 2020/0010116 | A1 * | 1/2020 | Raffaelli | B62K 5/08 |

FOREIGN PATENT DOCUMENTS

| | | |
|---|---|---|
| EP | 2345576 A1 | 7/2011 |
| EP | 2810861 A1 | 12/2014 |
| EP | 2889210 A1 | 7/2015 |
| EP | 2899107 A1 | 7/2015 |
| FR | 2953184 A1 | 6/2011 |
| JP | 2001010577 A | 1/2001 |
| TW | 410339 B | 10/2013 |
| WO | 2013005007 A1 | 1/2013 |

\* cited by examiner

FORECARRIAGE OF A ROLLING MOTOR VEHICLE

CROSS-REFERENCE TO RELATED APPLICATIONS

This application is the U.S. National Stage Application of International Patent Application No. PCT/IB2016/058047, filed on Dec. 28, 2016, which claims priority to Italian Patent Application No. 102015000088097, filed on Dec. 28, 2015, the contents of each of which is incorporated herein by reference in its entirety.

FIELD OF APPLICATION

The present invention relates to a forecarriage of a rolling motor vehicle with roll block.

In particular, the motor vehicle according to the invention may be a motor vehicle equipped with two steering and rolling wheels at the front and a fixed axle drive wheel at the rear.

STATE OF THE ART

In the field of motor vehicles there is a growing supply of "hybrid" vehicles, which combine the characteristics of motorcycles in terms of handling, with the stability of four-wheeled vehicles.

Such models are represented, for example, by three-wheeled motor vehicles equipped with two front steering wheels and four wheel motor vehicles known as QUADs.

More specifically, the aforementioned three-wheeled motor vehicles are provided with two steering and rolling wheels (i.e. tilting or inclining) at the front and a fixed axle drive wheel at the rear. The rear wheel is intended to provide torque and thus allow traction, while the front wheels, paired, are intended to provide the directionality of the vehicle. The paired wheels at the forecarriage can tilt and roll as well as steer. Thanks to this solution compared to three-wheeled motor vehicles with two wheels at the rear, motor vehicles with two wheels at the forecarriage are like an actual motorbike since, just like a motorbike, the vehicle is able to incline in a curve. Compared to a motor vehicle with only two-wheels, such vehicles with two paired wheels on the forecarriage have however a greater stability ensured by the double support on the ground of the front wheels, similar to that provided by a car.

The front wheels are kinematically connected to each other by means of kinematic mechanisms which enable the front wheels to roll synchronously and in a specular manner for example through the interposition of articulated quadrilaterals. Such vehicles are further provided with two independent suspensions, one for each of the two front wheels, equipped with shock absorbers which are also independent.

Rolling, three-wheeled motor vehicles are thus designed to provide the user with the handling of a two-wheel motorcycle and, at the same time, the stability and safety of a four-wheeled motor vehicle.

A rolling three-wheeled motor vehicle of this type is described for example in the Italian patent application no. IT2003MIA001108 on behalf of the same applicant.

Due to the structural peculiarities of this type of motor vehicle it is possible that under particular travel conditions, for example, at very low speeds or during breaks or stops the vehicle may fall over as a result of an accidental and/or uncontrolled rolling movement.

This problem has been addressed by equipping the aforesaid vehicles with roll block systems, operated by the user manually or by an automatic control system.

A roll block system for such motor vehicles is described for example in the Italian patent application no. IT2004A000171, on behalf of the same applicant. The roll block system is described in relation to a rolling motor vehicle equipped with a steering system with an articulated quadrilateral structure and two independent front suspensions. The roll block system comprises: a mechanical caliper suitable to block the movements of the articulated quadrilateral so as to prevent the rolling permitted by it; two hydraulic calipers operated simultaneously by an electric motor acting on rods placed in parallel with the shock absorbers so as to prevent the rolling caused by asymmetric spring suspension movements of the two wheels.

A first disadvantage of the block system described above lies in its complexity. It requires in fact three separate blocking devices: one acting on the articulated quadrilateral; two on the shock absorbers.

This system also has the disadvantage of making the motor vehicle rigid not only to the rolling movements caused by the quadrilateral and/or by asymmetric spring suspension movements, but also to the pitching movements (symmetrical spring suspension movements).

Blocking of the pitching requires adequate dimensioning of the blocking devices of the shock absorbers with increased production costs. In fact, in the event of the vehicle suffering impact from the road (e.g. from a hole) with the rolling blocked, the blocking system must be able to overcome the impulsive peak of the impact force to avoid changing the geometric configuration of the suspension.

In some situations, blocking pitching may also have consequences on the behaviour of the vehicle and thus on safety. For example, if a front wheel were subjected to an impact such as to overcome the force of the blocking device of the relative shock absorber, the wheel would lift and the motor vehicle would thus be lowered on that side. Once the impact were over the blocking device would keep the vehicle in the new position reached, thus placing the motor vehicle in an unsafe configuration.

Parallel blocking of the shock absorbers also has consequences when braking. The vehicle is, in fact, "blocked" in a situation of balance different from that one which would be statically required, since the forecarriage is blocked lower down, under a load resulting from the sum of the static load and the dynamic transfer due to braking.

Other anti-roll systems intended for rolling motor vehicles provided with a steering system with an articulated quadrilateral structure are described in the European patent application EP2810861A1, the French patent FR2953184 and the European patent EP2345576B1. Such anti-roll systems operate directly on the articulated quadrilateral structure and block the rolling by blocking the movement of the articulated quadrilateral. These anti-roll systems are not however capable of inhibiting rolling movements due to the asymmetric shaking permitted by the shock absorbers of the two front wheels.

In addition, the anti-roll systems mentioned above, since specifically designed to operate on a steering system with an articulated quadrilateral structure, are directly bound to the presence of this structure and its mechanical configuration.

There is therefore a need to develop a rolling motor vehicle fitted with a roll block system which overcomes entirely or in part the limitations set out above.

PRESENTATION OF THE INVENTION

The purpose of the present invention is therefore to eliminate or at least reduce, the problems mentioned above relative to the prior art, by providing a forecarriage of a rolling motor vehicle equipped with a roll block system which, when activated, does not inhibit the pitching of the motor vehicle due to a symmetric compression of the shock absorbers and does not affect the steering.

A further purpose of the present invention is to make available a forecarriage of a rolling motor vehicle fitted with a roll block system which is constructively simple and inexpensive to produce and fit to said motor vehicle.

DESCRIPTION OF THE DRAWINGS

The technical characteristics of the invention can be seen clearly from the contents of the following claims and the advantages of the same will be more clearly comprehensible from the detailed description below, made with reference to the appended drawings, showing one or more embodiments by way of non-limiting examples, wherein:

DETAILED DESCRIPTION

Figure 1:
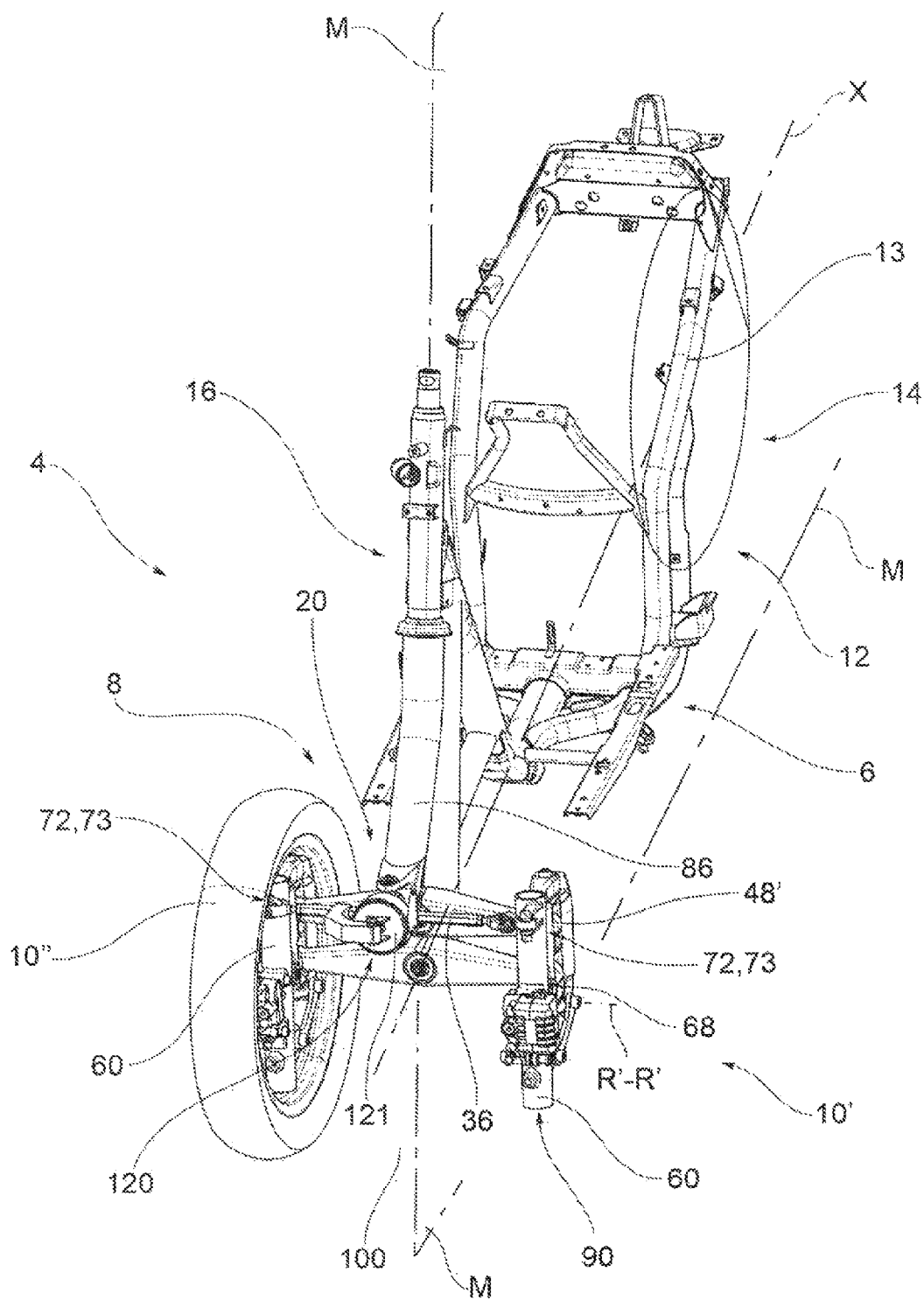
FIG. 1 shows a perspective front view of a motor vehicle equipped with a forecarriage with a roll block system according to a first embodiment of the invention and provided with an articulated quadrilateral rolling kinematic mechanism of the type which guides and supports the axle journals via a connection system of the roto-translatory type.

With reference to the aforementioned figures, reference numeral 4 globally denotes a motor vehicle according to the present invention.

For the purposes of the present invention, it should be pointed out that the term motor vehicle should be considered in a broad sense, encompassing any motor cycle having at least three wheels, i.e. two aligned wheels, as described better below and at least one rear wheel. Such definition therefore also comprises so-called quad bikes having two wheels on the forecarriage and two wheels on the rear.

The motor vehicle 4 comprises a frame 6 extending from a forecarriage 8, supporting at least two front wheels 10, to a rear 12 supporting one or more rear wheels 14. It is possible to distinguish a left front wheel 10' and a right front wheel 10" in which the definition of left and right 10', 10" is purely formal and means in relation to a driver of the vehicle. Said wheels are arranged to the left and right of the centreline plane M-M of the motor vehicle, compared to a point of observation of a driver driving it.

In the following description, and also in the drawings, reference will be made to symmetrical or specular elements of the forecarriage with respect to said centreline plane M-M using the quotes ' and' to indicate respectively the components to the left and right of the forecarriage, compared to a point of observation of a driver driving it.

For the purposes of the present invention, the frame 6 of the motor vehicle may be any shape, size and may for example be of the lattice type, box type, cradle, single or double, and so forth. The frame 6 of the motor vehicle may be in one piece or in multiple parts; for example the frame 6 of the motor vehicle interconnects with a rear frame 13 which may comprise an oscillating rear fork (not shown) which supports one or more rear drive wheels 14. The aforesaid rear oscillating fork may be connected to the frame 6 by direct hinging or by the interposition of a lever mechanism and/or intermediate frames.

According to a general embodiment of the present invention, the motor vehicle forecarriage 8 comprises a forecarriage frame 16 and a pair of front wheels 10', 10" kinematically connected to each other and to the forecarriage frame 16 by means of a rolling kinematic mechanism 20 which enables the front wheels to roll in a synchronous and specular manner.

Each wheel 10', 10" is connected to the aforesaid rolling kinematic mechanism 20 by means of a respective axle journal 60 which is mechanically connected to a rotation pin 68 of the wheel in order to support it rotatably around an axis of rotation R'-R', R"-R".

The "axle journal" of a wheel is understood to be the mechanical part of the motor vehicle designed to support the rotation pin of said wheel and to interconnect it kinematically to the suspensions, the steering device and to the aforesaid rolling kinematic mechanism 20. The axle journal has no degrees of freedom with respect to the wheel pin and is therefore kinematically integral therewith. The axle journal may be made in one piece with the wheel pin or be mechanically constrained to it to form a single piece.

The forecarriage 8 of the motor vehicle further comprises:
a roll block system 100, and
suspension means 90 which provide each axle journal 60 at least one spring suspension movement with respect to the rolling kinematic mechanism 20.

The rolling kinematic mechanism 20 can have any configuration as long as it is functional to enable the front wheels to roll in a synchronous and specular manner.

In particular, such rolling kinematic mechanism may be a system configured as an articulated parallelogram system, or be a suspended longitudinal arms system.

The forecarriage 8 comprises a steering device 36, 86 which kinematically connects the axle journals 60 one to each other so as to command the rotation of the axle journals 60 around respective steering axes S'-S' and S"-S" of each front wheel 10', 10".

Preferably, as shown in the appended drawings, the aforesaid rolling kinematic mechanism 20 is an articulated quadrilateral system.

In more detail, as shown in the examples of the appended drawings, such articulated quadrilateral system comprises a pair of cross members 24', 24", hinged to the forecarriage frame 16 in correspondence of middle hinges 28. The cross members 24', 24" are connected together at opposite transversal ends 40, 44 by uprights 48', 48" pivoted at said transversal ends 40, 44 at side hinges 52. The cross members 24 and the uprights 48', 48" define the aforesaid articulated quadrilateral 20.

Operatively, each of the uprights 48', 48" guides and supports an axle journal 60 of one of said front wheels 10', 10".

Figure 4:
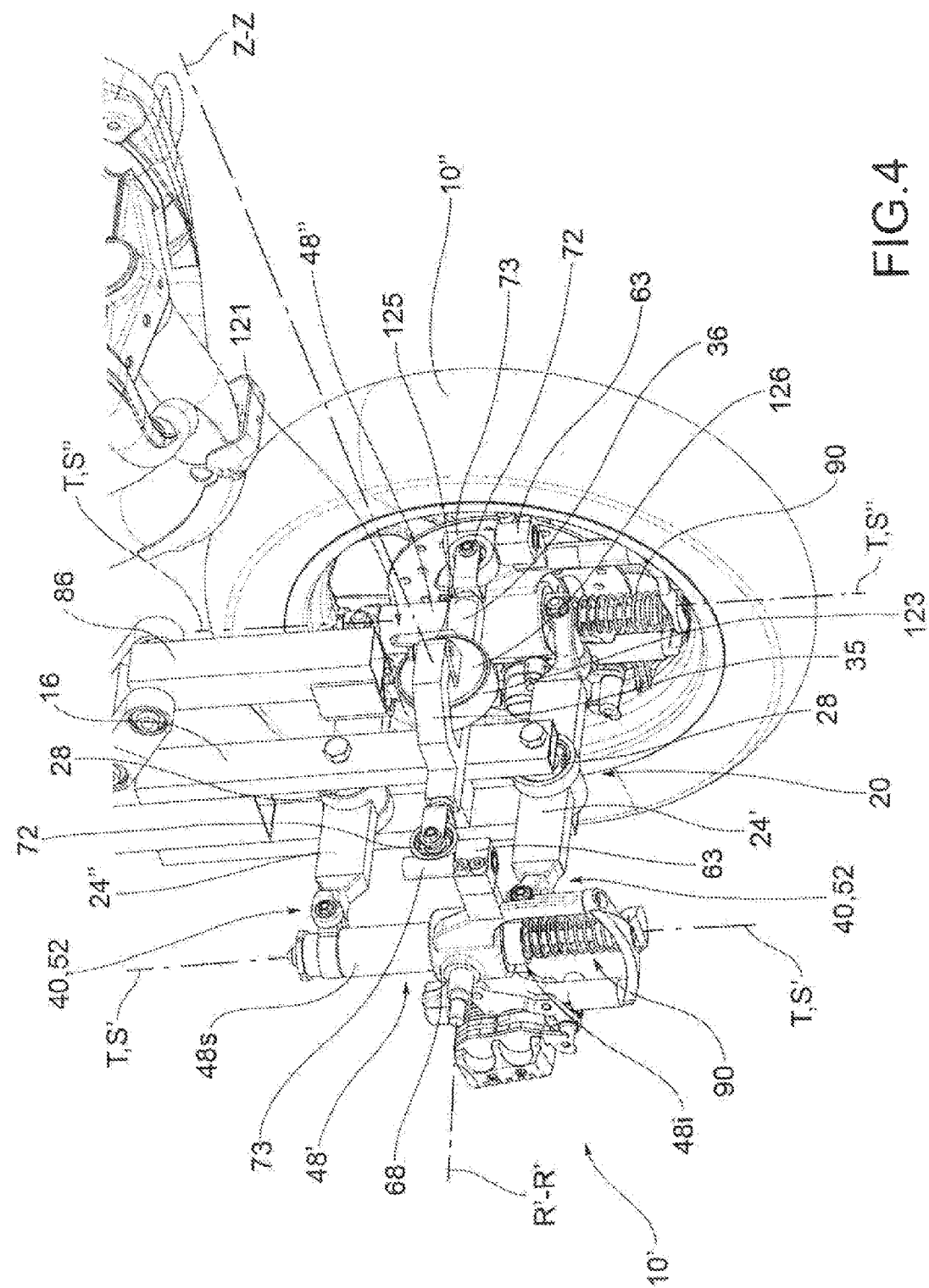
FIG. 4 shows a rear perspective view of the forecarriage of a motor vehicle with a roll block system according to the first embodiment of the invention; and provided with an articulated quadrilateral rolling kinematic mechanism of the type which guides and supports the axle journals of the wheels coaxially to the main extension axes of the uprights.
Figure 7:
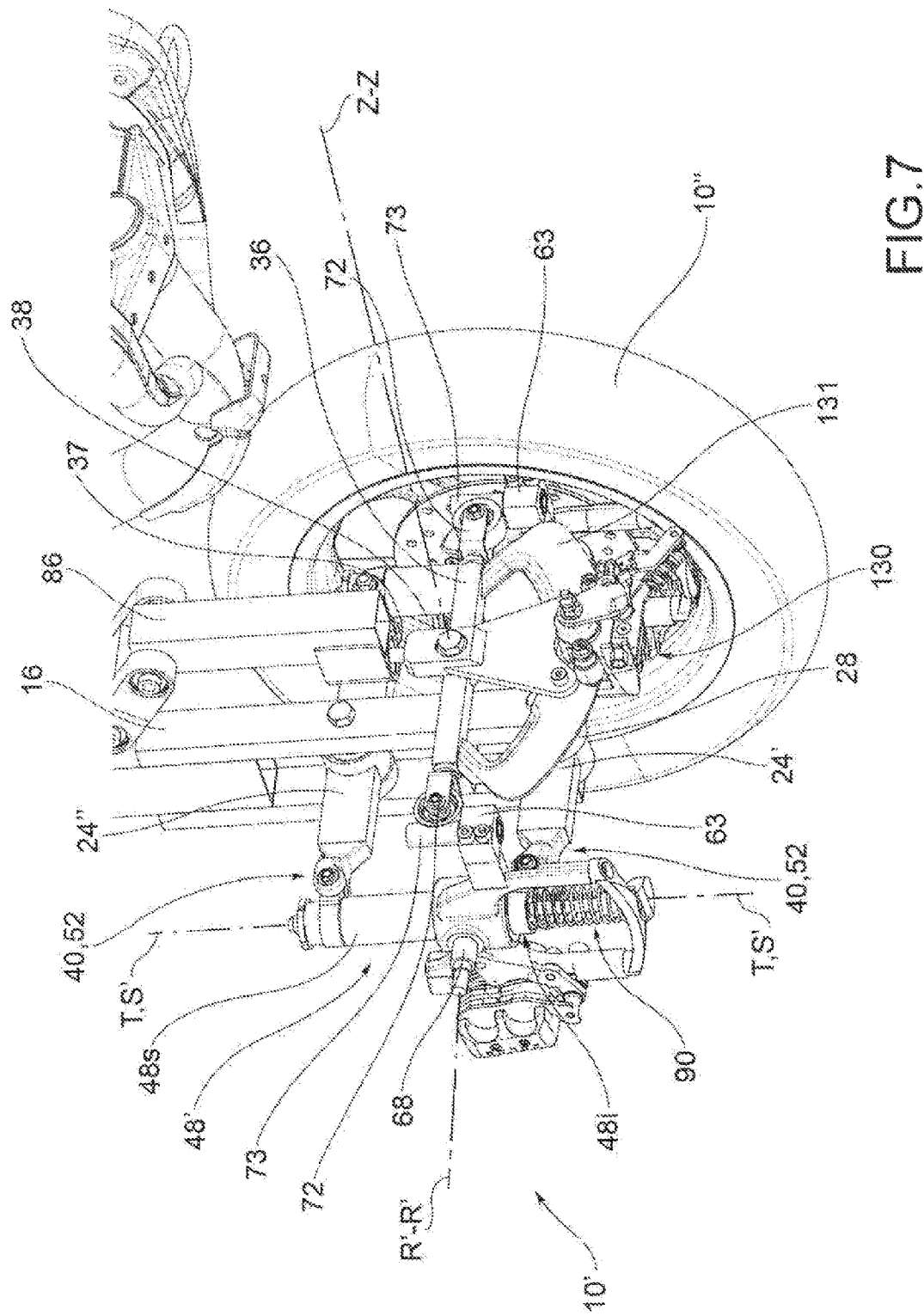
FIG. 7 is a rear perspective view of the forecarriage of a motor vehicle with a roll block system according to the second embodiment of the invention and provided with an articulated quadrilateral rolling kinematic mechanism of the type which guides and supports the axle journals of the wheels coaxially to the main extension axes of the uprights.

Advantageously, as provided for example in the embodiments shown in FIGS. 4 and 7, the articulated quadrilateral rolling kinematic mechanism 20 may be made in such a way that each of the uprights 48',48" guides and supports the axle journal 60 of the respective front wheel 10', 10" coaxially to its main extension axis T-T. In such case, the suspension means 90 of each front wheel are integrated in the relative upright and provide the axle journal 60 a rectilinear spring suspension movement along the main extension axis T-T of the upright 48',48".

More specifically, the axle journal 60 comprises a sleeve 88 placed coaxially to the upright 48',48". Between the axle journal 60 and the upright 48',48" are arranged suspension means 90 of the wheel 10. For example, the suspension means 90 comprise a spring and/or a damper.

In particular, the uprights 48',48" are hollow so as to house internally, at least partially, the suspension means. Preferably, the suspension means 90 are arranged coaxially to the respective upright 48',48".

Preferably, according to such embodiments, the coupling between each axle journal 60 and the respective upright 48',48" is of the cylindrical type, so as to allow both translation and rotation of the axle journal 60 with respect to the main extension axis T-T of the upright 48',48". Each front wheel 10', 10" has a steering axis S'-S', S"-S" which coincides with the main extension and symmetry axis T-T of the relative upright 48', 48".

In particular, each upright 48', 48" extends from an upper end 48s to a lower end 48i. The rotation pin 68 of each front wheel 10', 10" (integral with the axle journal 60) is placed between the upper end 48s and the lower end 48i of the corresponding upright 48', 48" of the articulated quadrilateral rolling kinematic mechanism 20.

Figure 2:
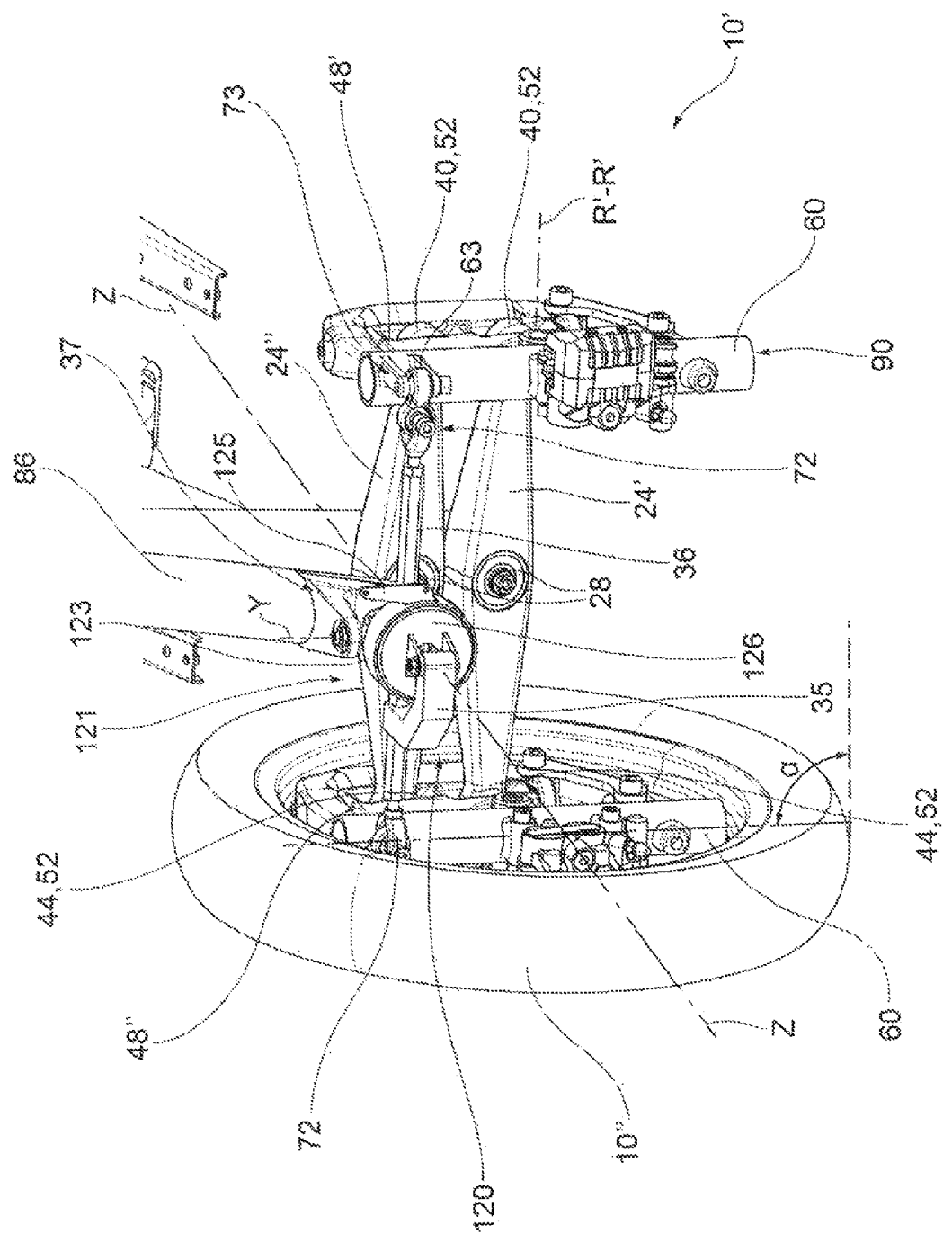
FIG. 2 shows an enlarged detail of FIG. 1 relative to the forecarriage of the motor vehicle.
Figure 6:
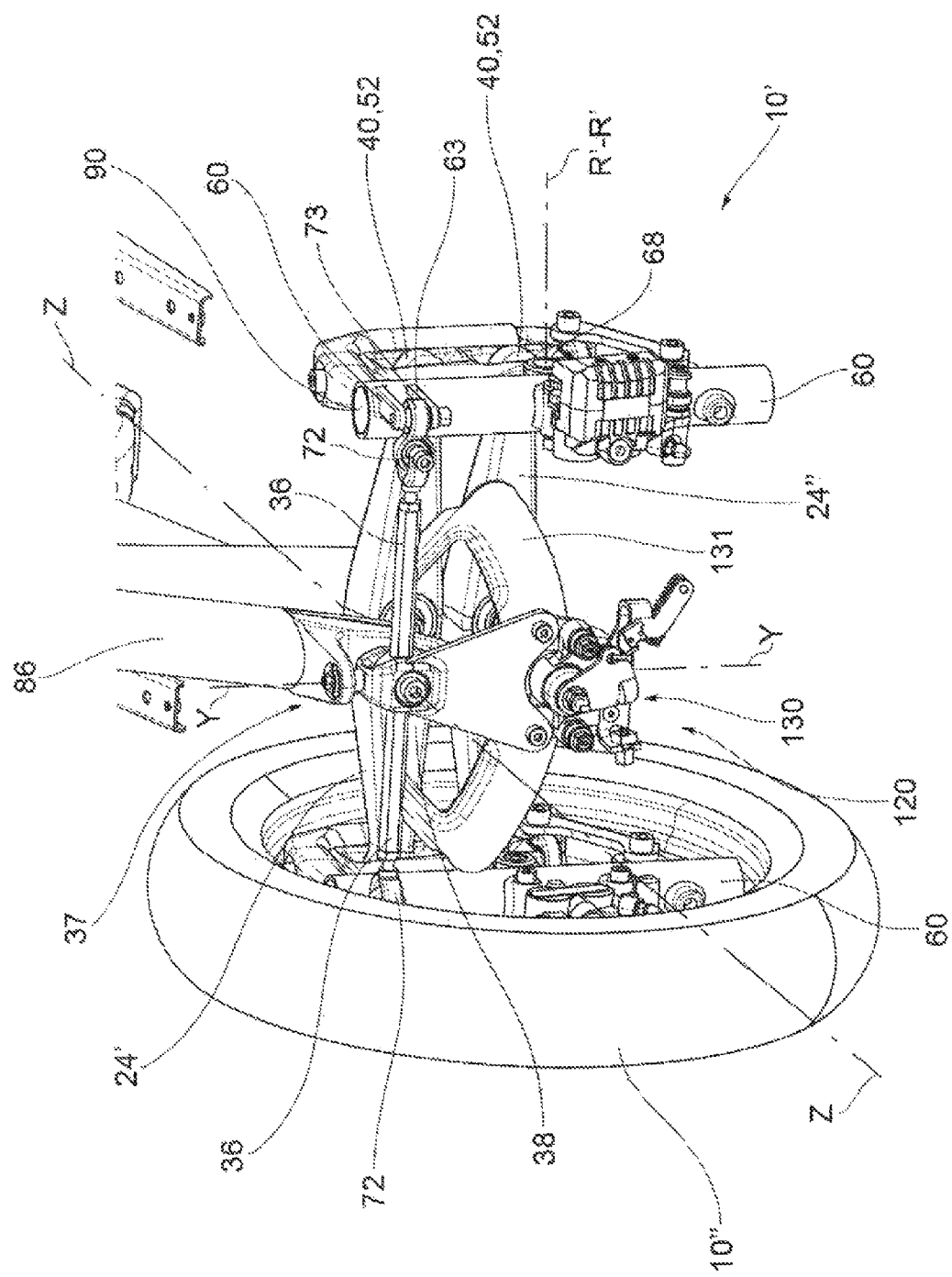
FIG. 6 is a front perspective view of the forecarriage of a motor vehicle with a roll block system according to a second embodiment of the invention and provided with a rolling kinematic mechanism with articulated quadrilateral of the type which guides and supports the axle journals via a connection system of the roto-translatory type.
Figure 8:
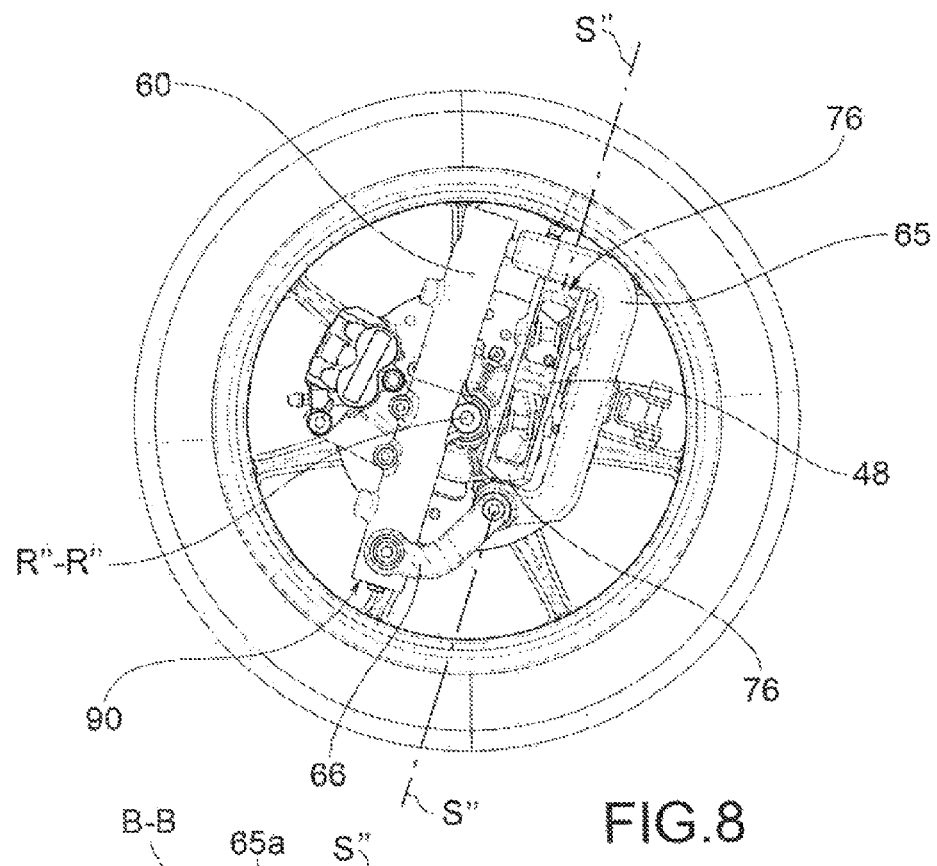
FIGS. 8, 9 and 10 show some partial detailed views of the forecarriage shown in FIGS. 2 and 6 relative to the interconnection between the axle journal and articulated quadrilateral.
Figure 9:
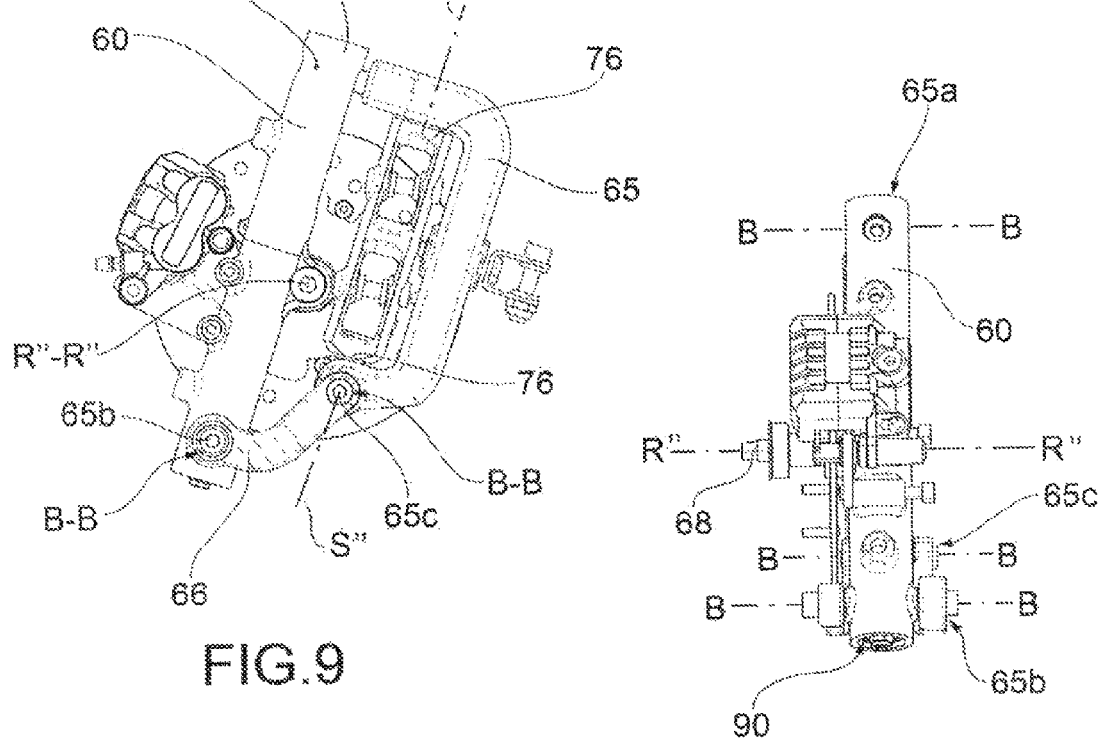
Figure 10:
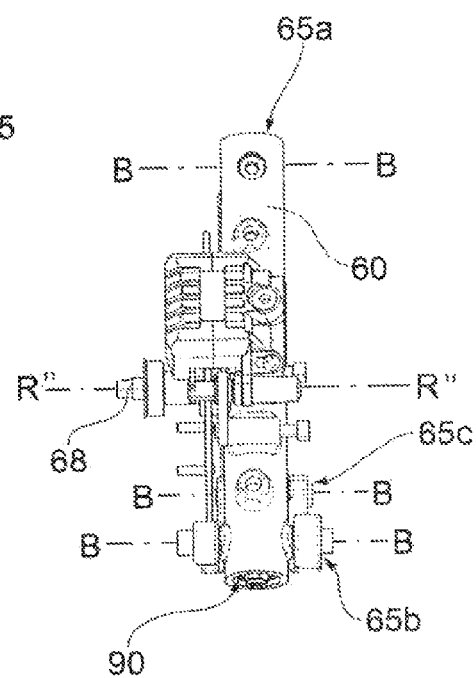

Alternatively, as provided for in the embodiments shown in FIGS. 1, 2 and 6 and in the FIGS. 8, 9 and 10, the articulated quadrilateral rolling kinematic mechanism 20 may be made in such a way that each of the uprights 48',48" guides and supports the axle journal 60 of the respective front wheel 10', 10" externally to itself by means of a roto-translational type kinematic connection system.

More specifically, each axle journal 60 is supported by a support bracket 65 which in turn is hinged to the aforementioned articulated quadrilateral 20 by means of steering hinges 76 arranged in correspondence of the upper 48s and lower 48i ends of each upright 48', 48". Said steering hinges 76 define the respective steering axes S'-S', S"-S" of the wheels 10', 10", parallel to each other.

More specifically, as shown in particular in FIGS. 2 and 9,—the axle journal 60 is hinged to the support bracket 65 at opposite upper and lower axial ends by means of at least three tilting hinges 65a, 65b, 65c which define respective tilting axes B-B and which realise a roto-translational connection between the axle journal 60 and the support bracket 65. In particular, the axle journal 60 is hinged to the support bracket 65 via a connecting rod 66 by means of two of said hinges 65b and 65c.

The suspension means 90 of each front wheel may, in particular, be integrated in the respective axle journal 60. More specifically, the axle journal 60 comprises a sheath inside which a spring is inserted (not visible in the figures) mechanically connected by means of a rod to the support bracket. The sheath is movable with respect to the rod under the effect of the spring.

Operatively, such system defines a spring suspension movement along a curvilinear trajectory.

According to an embodiment not illustrated in the appended figures, the aforesaid rolling kinematic mechanism 20 may be a system with two suspended arms.

More specifically, such a system may comprise, in particular, two suspended arms, hinged at their first ends to the forecarriage frame to rotate about a common axis of rotation, transverse to the centreline plane M-M of the motor vehicle. At its second ends, opposite the first, both said arms are suspended by suspension means, in turn supported by a rocker arm, hinged to the forecarriage frame. The rolling movement of the two front wheels 10' and 10" is permitted by the oscillation of the two suspended arms and the rocker arm. Each suspended arm supports at its second end an axle journal 60 of one of the two front wheels 10' and 10". In particular, each axle journal 60 is rotationally connected to the respective suspended arm to rotate about its own steering axis S'-S', S"-S". The steering device acts on two gripping portions integral with the axle journals.

According to the invention, said steering device comprises a steering column 86 and a horizontal steering bar 36 which directly connects the two axle journals 60 one to each other at its two ends by hinging means.

Preferably, the steering bar 36 extends as a single piece from one end to the other. Alternatively, the bar 36 can be made of two or more separate portions, interconnected to form a single body.

In turn, the steering bar is hinged to the steering column 86 at an intermediate point between its two ends so as to oscillate with respect to the steering column 86 around a first rotation axis Z-Z substantially orthogonal to a rolling plane of the two front wheels 10', 10" defined by the rolling kinematic mechanism 20.

Advantageously, the interconnection between the steering bar 36 and the steering column 86 is made in such a way that the bar 36 is able to follow the spring suspension movements of the axle journals and of the front wheels. In other words, the steering bar 36 is supported by the column 86 with a decoupling of the spring suspension movements, for example by means of a kinematic mechanism with a double connecting rod.

The roll block system 100 comprises releasable means 120 for reversibly blocking the lying position of the steering bar 36 with respect to a vertical projection plane, which is transverse to a centreline plane M-M of the motor vehicle.

The "lying position" of the steering bar with respect to a vertical projection plane, which is transverse to a centreline plane M-M of the motor vehicle, means the angle formed by the projection of the steering bar on said vertical plane.

Said vertical projection plane substantially corresponds to the rolling plane. Therefore, the vertical projection plane results to be perfectly orthogonal to the centreline plane M-M, when the wheels are parallel to centreline plane, or results to be inclined with respect to the centreline plane M-M, when the wheels are steering.

In other words, said releasable means 120 for reversibly blocking the lying position of the steering bar 36 are able to selectively block the movements of the steering bar 36 cinematically corresponding to rolling movements of the wheels 10', 10".

Operatively, when the aforesaid releasable blocking means 120 are deactivated, the steering bar 36 is free to change its lying position with respect to the projection plane and passively follows the movements of the two wheels 10', 10' with respect to each other and to the frame 16 without interfering with them except to control the steering.

When the aforesaid releasable means 120 for blocking are activated, the steering bar 36 is prevented from changing its lying position with respect to the aforesaid projection plane thereby constraining the relative position between the two axle journals 60.

Advantageously, the forecarriage 8 and the motor vehicle 4 comprise an automatic electronic actuation system.

The aforesaid means 120 for blocking the lying position of the steering bar 36 are configured to be controlled by said automatic electronic actuation system according to a predefined control logic or, alternatively or in parallel, they are configured to be controlled according to manual commands imposed by the user of the motor vehicle via a manual actuation system.

Preferably, the forecarriage 8 and the motor vehicle 4 comprise an electronic control system, which is configured to filter the manual commands set by the user according to a main operating logic of the motor vehicle aimed at ensuring the safety thereof.

As already noted in the introduction, in the technical solutions of the prior art blocking of the rolling is performed by blocking all the elements responsible for the rolling, i.e. arms, forks, rocker arms and suspensions.

Differently, according to the present invention blocking of the rolling is performed by interconnecting the two front wheels operating on only two elements, i.e. the axle journals of the wheels. For such interconnection an existing component is exploited, i.e. the steering bar, the roll block operating on it.

The interconnection of the two wheels at the respective axle journals makes the roll block system according to the present invention selective towards rolling movements.

As noted previously, the suspension means 90 provide each axle journal at least a spring suspension movement with respect to the rolling kinematic mechanism 20. The axle journals are thus associated to the wheels in the spring suspension movements. For this reason, their mutual interconnection via the roll block system according to the invention (even with the blocking means activated) does not interfere with the pitching movements (symmetrical spring suspension movements). It follows therefore that the roll block system is transparent to the pitching movements.

Moreover, thanks to the fact that the interconnection between the axle journals 60 is achieved by the steering bar 36, the roll block system 100 according to the invention (even with the blocking means activated) does not interfere with the steering movements. The blocking of the lying position of the steering bar does not prevent the transmission of movements around the steering axes. It follows therefore that the roll block system is also transparent to the steering.

From the above tt emerges therefore that with the blocking means activated, the roll block system 100 according to the invention only prevents rolling movements (also deriving from asymmetric spring suspension movements), leaving instead free the pitching (symmetrical spring suspension) and steering movements, while with the blocking means deactivated the roll block system 100 according to the invention does not introduce any kinematic uncorrection to the movements of the wheels due to steering, rolling (also from asymmetrical spring suspension) and pitching (symmetrical spring suspension).

Lastly, thanks to the fact that the roll block system 100 acts directly on the axle journals and not on the rolling kinematic mechanism which enables the wheels to roll synchronously and in a specular manner, the roll block system 100 according to the invention is not directly conditional to the presence of said rolling kinematic mechanism and its mechanical configuration.

Operatively, the blocking of the lying position of the steering bar 36 with respect to a vertical projection plane transverse to a centreline plane M-M of the motor vehicle automatically determines the blocking angle α formed by a lying plane of at least one wheel relative to the ground. The steering bar—insofar as placed to connect the axle journals of the two wheels at its two ends—is obliged to follow the rolling movements of the two wheels varying their lying position with respect to a vertical projection plane, which is transverse to a centreline plane M-M of the motor vehicle. At the moment in which the lying position of the steering bar 36 is forcibly blocked by virtue of the aforesaid connection, the lying position of the respective wheels also results blocked, and accordingly the rolling movements of the two wheels, corresponding to variations of the angle α formed by a lying plane of each wheel relative to the ground, are blocked.

The blocking of the angle of a wheel also leads to the blocking of the angle of the other wheel given that the two front wheels 10', 10" are kinematically connected together by means of said kinematic rolling mechanism 20 to roll in a synchronous and specular manner.

As already said, all this applies regardless of the configuration of said rolling kinematic mechanism 20, which may in particular be an articulated quadrilateral or suspended arms.

When the releasable blocking means 120 are deactivated, the steering bar 36 is free to change its lying position with respect to the aforesaid projection plane; differently, when the releasable blocking means 120 are activated, the steering bar 36 is prevented from changing its lying position with respect to said projection plane, thereby leading to the blocking of the rolling movements of the two wheels connected to it via the axle journals.

Preferably, the aforesaid hinging means, with which the steering bar 36 is connected to the axle journals 60 at both its ends, consist of a ball joint or of a device kinematically equivalent to a ball joint. This way, the steering bar 36 is able to second the reciprocal movements of the two front wheels 10', 10" with respect to the forecarriage frame 16 without causing jamming or blocks.

In particular, the aforesaid device kinematically similar to a spherical joint may consist of a pair of cylindrical hinges 72, 73 with axes orthogonal to each other. Preferably one of the two hinges 72 of said pair has its own hinge axis orthogonal to the rolling plane of the two front wheels of 10', 10".

Preferably, this hinging solution is adopted in the case in which the steering bar 36 lies and moves on a plane substantially parallel to a rolling plane of the two front wheels defined by said first rolling kinematic mechanism 20. This occurs in particular in the case in which the rolling kinematic mechanism is composed of an articulated quadrilateral in which the uprights guide the movement of the axle journals according to a rectilinear motion.

The "rolling plane" is understood to mean a plane transverse to the longitudinal direction X-X or direction of travel of the motor vehicle, and thus incident to the centreline plane M-M of the motor vehicle. Advantageously, in such case one of the two hinges of such pair has its own hinging axis orthogonal to the rolling plane of the two front wheels 10', 10", in such a way that the steering bar 36 can move parallel to the aforesaid rolling plane when the releasable blocking means 120 are activated.

In general, and in particular in the cases in which the rolling kinematic mechanism does not allow a rectilinear spring suspension movement to the axle journals, it is preferable for the hinging means of the steering bar 36 to consist of ball joints so as to prevent jamming in the movements of said steering bar 36.

Advantageously, the ball joints or the pairs of hinges 72, 73 are connected to the axle journals 60 by means of support elements 63 integral with said axle journals.

As provided for in the embodiments illustrated in the appended drawings, the steering bar 36 connects the two axle journals 60 at the same height relative to the ground, so as to be parallel to the ground. In the case in which the rolling kinematic mechanism 20 consists of an articulated quadrilateral, said steering bar 36 is, in particular, substantially parallel to the cross members 28 of the articulated quadrilateral.

According to the embodiments illustrated in particular in FIGS. 1 to 7, the releasable means 120 for blocking the lying position of the steering bar 36 are suitable to block the oscillation of the steering 36 with respect to the steering column 86 around the aforesaid first rotation axis Z-Z, substantially orthogonal to a rolling plane of the two front wheels 10', 10" defined by the rolling kinematic mechanism 20.

The blocking of the lying position of the steering bar 36 is thus performed at the interconnection area with the steering column 86.

Figure 3:
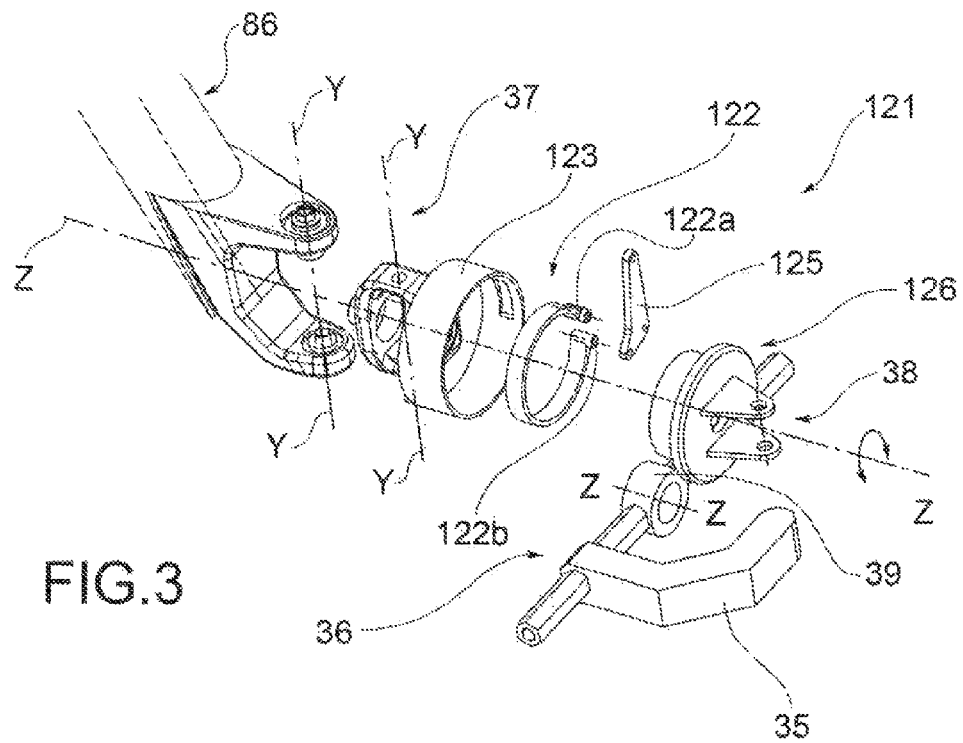
FIG. 3 shows an exploded perspective view of a detail of FIG. 2, relative to the interconnection means between a steering bar and a steering column.
Figure 5:
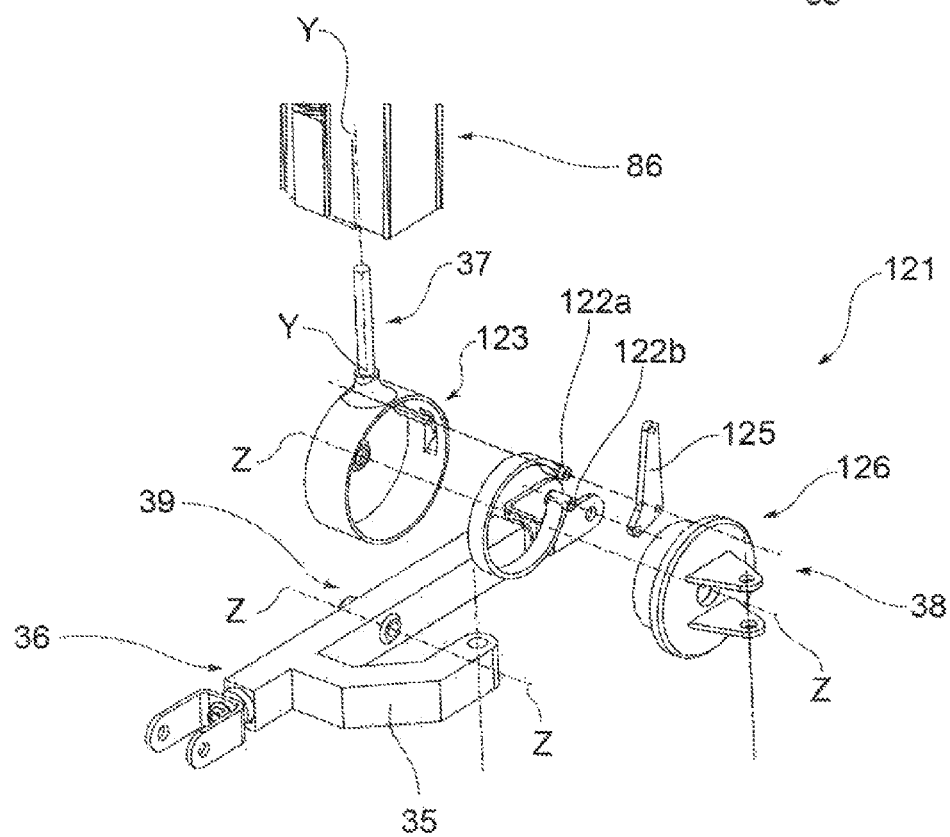
FIG. 5 shows an exploded perspective view of a detail of FIG. 4, relative to the interconnection means between a steering bar and a steering column.

According to the first embodiment illustrated in FIGS. 2 and 4 and in FIGS. 3 and 5, the releasable blocking means 120 may consist of a band brake 121 associated with an oscillating hinge 38 of the steering bar 36 with respect to the steering column 86 around the aforesaid first axis of rotation Z-Z. Operatively, the band brake 121, when actuated, is suitable to prevent the free rotation of the steering bar 36 with respect to the steering column 86 around the first rotation axis Z-Z.

FIG. 2 shows the forecarriage of a motor vehicle with a roll block system according to the aforesaid first embodiment of the invention provided with an articulated quadrilateral rolling kinematic mechanism of the type which guides and supports the axle journals of the wheels by means of a roto-translational kinematic connection system.

More specifically, as shown in particular in FIG. 3, the interconnection area between the steering bar 36 and steering column 86 is defined by a double hinge. A first hinge 37 has a vertical (or substantially vertical) axis for the transmission of the rotation movement around a main steering axis Y-Y from the column 86 to the steering bar 36. A second hinge 38 is the aforesaid oscillation hinge, for the rotation of the steering bar 36 around the aforesaid first axis of rotation Z-Z substantially orthogonal to the rolling plane of the two front wheels 10', 10". In particular, such first axis Z-Z is horizontal or substantially horizontal. The steering bar 36 is provided, in an intermediate position, with a bushing 39 for rotation around the first rotation axis Z-Z.

The band brake 121 is arranged in correspondence with said oscillation hinge 38 around the first axis of rotation Z-Z.

The brake 121 comprises: a support body 123 integral with the first hinge 37 and a drum 126 which is rotationally associated to the support body 123 to rotate around the first rotation axis Z-Z and is integrally associated to the steering bar 36 via a support arm 35 which extends cantilevered from said bar. The drum 126 is partially inserted inside the support body 123 and forms with it an annular interspace inside which a band 122 is housed. The two ends 122a and 122b of the band 122 are fixed to an actuation lever 125 of the band brake in different positions. By actuating the lever 125, the band 122 is tightened around the drum 126 and prevents its rotation around the axis Z-Z. This prevents the rotation of the steering bar 36 around the first rotation axis Z-Z which is substantially orthogonal to the rolling plane of the two front wheels 10' 10". When the lever 125 is not actuated, the band 122 is not tightened around the drum and the steering bar 36 is free to rotate around the first axis Z-Z, following the rolling movements of the two front wheels 10', 10" and of the relative axle journals 60.

FIG. 4 shows the forecarriage of a motor vehicle with a roll block system according to the aforesaid first embodiment of the invention provided with an articulated quadrilateral rolling kinematic mechanism of the type which guides and supports the axle journals of the wheels coaxially to the main extension axes of the uprights.

As shown in particular in FIG. 5, the interconnection area between the steering bar 36 and steering column 86 is defined by a double hinge. The structure is similar to that described in relation to the embodiment in FIG. 3. A first hinge 37 has a vertical (or substantially vertical) axis for the transmission of the rotation movement around the main steering axis Y-Y from the column 86 to the steering bar 36. A second hinge 38 is the aforesaid oscillation hinge, for the rotation of the steering bar 36 around the aforesaid first axis of rotation Z-Z substantially orthogonal to the rolling plane of the two front wheels 10', 10". In particular, such first axis Z-Z is horizontal or substantially horizontal. The steering bar 36 is provided, in an intermediate position, with a bushing 39 for rotation around the first rotation axis Z-Z.

The band brake 121 has a structure and operation similar to that of the band brake described in relation to FIG. 3. Also the components are similar and maintain the same numbers in the figures. For the sake of brevity therefore a description of the band brake 121 is not provided, referring to that made above.

Alternatively to the band brake 121, it is possible to use a drum brake (not shown in the appended drawings). Alternatively, other blocking or brake devices suitable for the purpose may be provided for.

According to a second embodiment illustrated in FIGS. 6 and 7, the releasable blocking means 120 may consist of a caliper 130 acting on a sector 131 of a brake disc. The caliper 130 is integral with the oscillation hinge 38 of the steering bar 36 with respect to the steering column 86, while the sector of disc 131 is integral with the steering bar 36 and extends around the aforementioned first rotation axis Z-Z.

FIG. 6 shows the forecarriage of a motor vehicle with a roll block system according to the aforesaid second embodiment of the invention provided with an articulated quadrilateral rolling kinematic mechanism of the type which guides and supports the axle journals of the wheels by means of a roto-translational kinematic connection system.

FIG. 7 shows the forecarriage of a motor vehicle with a roll block system according to the aforesaid second embodiment of the invention provided with an articulated quadrilateral rolling kinematic mechanism of the type which guides and supports the axle journals of the wheels coaxially to the main extension axes of the uprights.

According to an alternative embodiment not illustrated in the appended figures, the releasable blocking means 120 may consist of a ratchet acting on a sprocket. The ratchet 130 is integral with the oscillation hinge of the steering bar 36 with respect to the steering column 86, while the sprocket is integral with the steering bar 36 and is concentric to the aforementioned first rotation axis Z-Z.

According to alternative embodiments not illustrated in the appended drawings, the aforesaid releasable means 120 for blocking the lying position of the steering bar 36 may be suitable to block the movement of at least one end of the steering bar 36 on the respective axle journal 60 so as to block the angle formed by the steering bar with said axle journal 60 on a vertical projection plane, which is transverse to a centreline plane M-M of the motor vehicle. The blocking of the lying position of the steering bar 36 is thus performed at the hinging area of the bar 36 with an axle journal 60.

The aforesaid releasable blocking means may be suitable to block the movement of the bar at one end only or at both ends.

Operatively, blocking the movement of at least one end of the steering bar 36 with respect to the lying plane of the respective wheel means blocking the lying position of said steering bar 36 with respect to a vertical projection plane, which is transverse to a centreline plane M-M of the motor vehicle. As explained above, this automatically results in a blocking of the rolling movements not only of the wheel directly affected by the blocking, but also of the other wheel. The blocking of the rotation at both ends of the steering bar is therefore not strictly necessary, but is functional to ensure more secure blocking of the bar.

The aforementioned releasable means for blocking the lying position can be made in any way suitable for the purpose.

Preferably, in correspondence with at least one of the two ends the steering bar 36 is connected to the respective axle journal by hinging means consisting of a pair of cylindrical hinges orthogonal to each other. The axis of rotation of a first hinge of said pair is orthogonal to the rolling plane of the two front wheels 10', 10" so that the steering bar can move parallel to said rolling plane when the blocking means are not actuated. The aforesaid releasable means 120 for blocking the lying position are suitable to block the rotation of the steering bar 36 around said first hinge so as to block the angle formed by the steering bar with the axle journal on the rolling plane.

In particular, the releasable means may comprise a band brake or a drum brake placed at the end of the steering bar which is connected to the respective axle journal by means of the aforementioned pair of cylindrical hinges orthogonal to each other. Operatively, the band brake or drum brake is associated to the first cylindrical hinge to block the rotation thereof in a releasable manner.

The steering bar 36 may be connected to the axle journals 60 at both its ends by means of a pair of cylindrical hinges orthogonal to each other. The rotation axis of a first hinge of each pair is orthogonal to the rolling plane of the two front wheels 10', 10". In this case, the releasable means 120 comprise a band brake or a drum brake positioned at each end of said steering bar 36. Each band brake or drum brake is associated to the respective first cylindrical hinge of a pair of hinges to block the rotation thereof in a releasable manner.

Alternatively, for the blocking of the lying position of the steering bar 36 at an axle journal, the aforesaid releasable means may comprise a strut extensible in length. Said strut is provided with blocking means of its length and connects the steering bar 36 diagonally to one of the two axle journals 60. The strut connects to the steering bar 36 and to the axle journal 60 at both its two ends via hinging means such that, when the strut is left free to extend in length, said strut is configured not to hinder the movement of the steering bar 36 with respect to the axle journal, while when the strut is blocked in length the strut is configured to prevent the rotation of the steering bar 36 with respect to the axle journal in the common lying plane of the steering bar and strut.

The aforesaid releasable means for blocking the lying position may comprise two struts extensible in length, each of which is provided with blocking means of its length and connects diagonally the steering bar 36 to one of the two axle journals 60. As in the case of the single strut, in this case too each of the two struts connects to the steering bar 36 and to the respective axle journal at its two ends via hinging means such that, when the strut is left free to extend in length, the strut is configured not to hinder the movement of the steering bar 36 with respect to the axle journal, while when the strut is blocked in length the strut is configured to prevent the rotation of the steering bar 36 with respect to the axle journal in the common lying plane of the steering bar and strut.

Advantageously, the hinging means of each strut consist of pairs of cylindrical hinges having axes orthogonal to each other, one of the two hinges having the rotation axis orthogonal to the rolling plane of the two front wheels.

The present invention relates to a motor vehicle 4 having at least one drive wheel on the rear and a forecarriage 8 according to the present invention, and in particular as described above.

In the case in which the motor vehicle is a quadricycle, the rear drive wheels 14 at the rear 12 are connected to each other and to a rear frame 13 by means of a rolling kinematic mechanism 20 as described above in relation to the front wheels 10 and are interconnected to each other by a roll block system identical to that comprised in the forecarriage of a rolling motor vehicle with three or four wheels according to the invention, and in particular as described above.

The present invention relates to a method for blocking the rolling movements of a rolling motor vehicle with three or four wheels, having a forecarriage according to the present invention, and in particular as described above. Said method comprises:

an activation step of the aforesaid releasable means 120 for reversibly blocking the lying position of the steering bar 36 so as to block the rolling movements of the two front wheels; and a deactivation step of the aforesaid releasable means 120 for reversibly blocking the lying position of the steering bar 36 so as to free the rolling movements of the two front wheels.

The present invention relates to a method of blocking the rolling movements of a rolling motor vehicle with three or four wheels, having:

a forecarriage frame 16, at least one pair of front wheels 10', 10" kinematically connected one to each other and to the forecarriage frame 16 by means of a rolling kinematic mechanism 20 which enables the front wheels to roll in a synchronous and specular manner, each wheel 10', 10" being connected to said rolling kinematic mechanism 20 by means of a respective axle journal 60, the latter being mechanically connected to a rotation pin 68 of the wheel in order to support it rotatably around an axis of rotation (R'-R', R"-R"), suspension means 90 which provide each axle journal 60 at least one spring suspension movement with respect to said rolling kinematic mechanism 20.

Such method comprises the operating step a) of providing a steering device 36, 86 which mechanically connects the axle journals 60 one to each other so as to command the rotation of the axle journals 60 around respective steering axes S'-S', S"-S" of each front wheel 10', 10". The steering device comprises a horizontal steering bar 36 which directly connects the two axle journals 60 to each other at its two ends by means of hinging means. The steering bar 36 is, in turn, hinged to a steering column 86 at an intermediate point between its two ends so as to oscillate with respect to the steering column 86 around a first rotation axis Z-Z substantially orthogonal to a rolling plane of the two front wheels 10', 10" defined by the aforesaid rolling kinematic mechanism 20.

The method comprises the operating step b) of providing releasable means 120 for reversibly blocking the lying position of said steering bar 36 with respect to a vertical projection plane, which is transverse to a centreline plane M-M of the motor vehicle.

The method further comprises the following two operating steps:

c) activating the aforesaid releasable means 120 for reversibly blocking the lying position of the steering bar 36 in such a way that the steering bar 36 is prevented from changing its lying position with respect to said projection plane so as to constrain the relative position between the two axle journals 60 and thus block the rolling movements of the two front wheels; and d) deactivating the aforesaid releasable means 120 for reversibly blocking the lying position of the steering bar 36 so that the steering bar 36 is free to change its lying position with respect to the projection plane so as to passively follow the movements of the two wheels 10', 10" with respect to each other and to the frame 16 without interfering with them except to control the steering and thus free the rolling movements of the two front wheels.

The invention permits numerous advantages to be achieved, in part already described.

The forecarriage of the rolling motor vehicle according to the invention is equipped with a roll block system which, when activated, does not inhibit either the pitching (symmetrical spring suspension movements), or steering of the motor vehicle. In fact, the roll block system according to the invention, when not actuated, does not introduce any kinematic uncorrection to movements of the wheels due to steering, rolling and spring suspension movements. When actuated, the block system permits blocking of the rolling movements, without interfering with the pitching (symmetrical spring suspension) and steering movements.

Moreover, the forecarriage of a rolling motor vehicle according to the invention is equipped with a roll block system which is constructively simple and inexpensive to produce and to fit on said motor vehicle. In fact it exploits the steering bar, which the motor vehicle already has and requires only the installation of releasable blocking means of the lying position of the steering bar.

The roll block system according to the invention is also independent of the rolling kinematic mechanism which enables the wheels to roll synchronously and in a specular manner.

The proposed system, in addition to being cheaper is also conceptually better than traditional solutions because with the rolling blocked the pitching (understood as a symmetrical suspension movement) is not inhibited, to the benefit of safety and reduction of the loads on the structure.

The invention thus conceived thereby achieves the intended objectives.

Obviously, its practical embodiments may assume forms and configurations different from those described while remaining within the sphere of protection of the invention.

Moreover, all the details may be replaced by technically equivalent elements and the dimensions, forms and materials used may be any as needed.

The invention claimed is:

1. Forecarriage of a rolling motor vehicle with three or four wheels, comprising:

a forecarriage frame, at least one pair of front wheels kinematically connected one to each other and to the forecarriage frame by means of a kinematic rolling mechanism which enables the front wheels to roll in a synchronous and specular manner, each front wheel being connected to said kinematic rolling mechanism by means of a respective axle journal, said axle journal being mechanically connected to a rotation pin of the front wheel in order to support said rotation pin rotatably around an axis of rotation, suspension means which provides each axle journal with at least one spring suspension movement with respect to said kinematic rolling mechanism, a steering device that kinematically connects the axle journals one to each other so as to command the rotation of the axle journals about respective steering axes of each front wheel, a roll block system, wherein said steering device comprises a horizontal steering bar that directly connects the two axle journals one to each other at two ends of the horizontal steering bar by means of hinging means, said horizontal steering bar being in turn hinged to a steering column at an intermediate point between said two ends of the horizontal steering bar so as to oscillate with respect to said steering column about a first rotation axis substantially orthogonal to a rolling plane of the two front wheels defined by said kinematic rolling mechanism, and wherein the roll block system comprises releasable blocking means adapted to reversibly block a lying position of said steering bar with respect to a vertical projection plane, which is transverse to a centreline plane of the motor vehicle, when said releasable blocking means is deactivated said steering bar being free to change its lying position with respect to said vertical projection plane passively following the movements of said two front wheels with respect to each other and to the frame without interfering with said two front wheels except to control the steering, when said releasable blocking means is activated said steering bar being prevented from changing its lying position with respect to said vertical projection plane in this way constraining the relative position between the two axle journals.

2. The forecarriage according to claim 1, wherein said hinging means is constituted by a ball joint or by a device kinematically equivalent to a ball joint.

3. The forecarriage according to claim 2, wherein said device kinematically equivalent to a ball joint is constituted by a pair of cylindrical hinges with axes orthogonal to each other.

4. The forecarriage according to claim 3, wherein one of the two hinges of said pair has a hinge axis orthogonal to the rolling plane of the two front wheels.

5. The forecarriage according to claim 1, wherein said steering bar connects the two axle journals together at a same height with respect to the ground.

6. The forecarriage according to claim 1, wherein said releasable blocking means for blocking the lying position of the steering bar is suitable to block the oscillation of the steering bar with respect to the steering column about said first rotation axis.

7. The forecarriage according to claim 6, wherein said releasable blocking means is constituted by a band brake or by a drum brake associated with an oscillation hinge of the steering bar with respect to the steering column, said band brake or said drum brake, when actuated, is suitable to prevent free rotation of the steering bar with respect to the steering column about the first rotation axis.

8. The forecarriage according to claim 6, wherein said releasable blocking means is constituted by a calliper acting on a brake disc sector, said calliper being integral with an oscillation hinge of the steering bar with respect to the steering column and said disc sector being integral with the steering bar and developing around said first rotation axis.

9. The forecarriage according to claim 6, wherein said releasable blocking means is constituted by a ratchet acting on a toothed wheel, said ratchet being integral with an oscillation hinge of the steering bar with respect to the steering column and said toothed wheel being integral to the steering bar and being concentric to said first rotation axis.

10. The forecarriage according to claim 1, wherein said releasable blocking means is suitable to block the movement of at least one end of the steering bar on the respective axle journal so as to block the angle formed by the steering bar with said axle journal on the vertical projection plane, which is transverse to the centreline plane of the motor vehicle.

11. The forecarriage according to claim 10, wherein, in correspondence of at least one of the two ends, said steering bar is connected to the respective axle journal by means of hinging means constituted by a pair of cylindrical hinges having axes orthogonal one to each other, the rotation axis of a first hinge of said pair of hinges being orthogonal to the rolling plane of the two front wheels in such a way that the steering bar can move parallel to said rolling plane when the releasable blocking means is not activated, said releasable blocking means being suitable to block the rotation of the steering bar about said first hinge so as to block the angle formed by the steering bar with the axle journal on the rolling plane.

12. The forecarriage according to claim 11, where said releasable blocking means comprises a band brake or a drum brake placed at the end of the steering bar which is connected to the respective axle journal by means of said pair of cylindrical hinges orthogonal to each other, said band brake or drum brake being associated with the first cylindrical hinge to block the rotation thereof in a releasable manner.

13. The forecarriage according to claim 10, wherein said horizontal steering bar is connected to the axle journals at both of said two ends of the horizontal steering bar by means of a pair of cylindrical hinges orthogonal to each other, the rotation axis of a first hinge of each pair being orthogonal to the rolling plane of the two front wheels, said releasable blocking means comprising a band brake or a drum brake arranged at each end of said steering bar, each band brake or drum brake being associated to the respective first cylindrical hinge to block the rotation in a releasable manner.

14. The forecarriage according to claim 10, wherein said releasable blocking means comprises a strut extensible in length, which is provided with means of blocking its length and diagonally connects said steering bar to one of the two axle journals, said strut connecting to the steering bar and the axle journal at both ends of the strut via hinge means such that, when the strut is left free to extend in length, said strut is configured not to hinder the movement of the steering bar with respect to the axle journal, while when the strut is blocked in length the strut is configured to prevent the rotation of the steering bar with respect to the axle journal in a common lying plane of the steering bar and the strut.

15. The forecarriage according to claim 14, wherein said hinging means is constituted by a pair of cylindrical hinges with axes orthogonal to each other, one of the two hinges having its rotation axis orthogonal to the rolling plane of the two front wheels.

16. The forecarriage according to claim 10, wherein said releasable blocking means comprises two struts extensible in length, each of which is provided with means of blocking its length and diagonally connects said steering bar to one of the two axle journals, each strut connecting to the steering bar and the respective axle journal at both ends of each strut by means of hinge means such that, when the strut is left free to extend in length, said strut is configured not to hinder the movement of the steering bar with respect to the axle journal, while when said strut is blocked in length said strut is configured to prevent the rotation of the steering bar with respect to the axle journal in a common lying plane of the steering bar and the strut.

17. The forecarriage according to claim 1, wherein said releasable blocking means of the lying position of said steering bar is configured to be controlled by an automatic electronic actuation system according to a predefined control logic or, alternatively or in parallel, said releasable blocking means is configured to be controlled according to manual commands imposed by a user of the motor vehicle via a manual actuation system.

18. The forecarriage according to claim 17, wherein an electronic control system is provided, wherein said electronic control system is configured to filter the manual commands set by the user according to a main operating logic of the motor vehicle aimed at ensuring the safety thereof.

19. Motor vehicle having a drive wheel at the rear and a forecarriage according to claim 1.

20. The motor vehicle according to claim 19, wherein the motor vehicle comprises two rear drive wheels at the rear.

21. The motor vehicle according to claim 20, wherein said rear drive wheels at the rear are connected together and to a rear frame by means of a kinematic rolling mechanism and are interconnected to each other by a roll block system identical to that comprised in the forecarriage of the rolling motor vehicle with three or four wheels.

22. Method of blocking rolling movements of a motor vehicle with three or four wheels, having a forecarriage according to claim 1, said method comprising:
 a step of activation of said releasable blocking means so as to block the rolling movements of the two front wheels; and
 a step of deactivation of said releasable blocking means so as to free the rolling movements of the two front wheels.

23. Method of blocking rolling movements of a rolling motor vehicle with three or four wheels, having:
 a forecarriage frame, at least one pair of front wheels kinematically connected one to each other and to the forecarriage frame by means of a kinematic rolling mechanism which enables the front wheels to roll in a synchronous and specular manner, each front wheel being connected to said kinematic rolling mechanism by means of a respective axle journal, said axle journal being mechanically connected to a rotation pin of the front wheel in order to support said rotation pin rotatably around an axis of rotation, suspension means which provides each axle journal at least one spring suspension movement with respect to said kinematic rolling mechanism, said method comprising the following operating steps:
- a) providing a steering device that kinematically connects the axle journals one to each other in such a way as to command the rotation of the axle journals about respective steering axes of each front wheel, said steering device comprising a horizontal steering bar that directly connects the two axle journals with each other at two ends of said horizontal steering bar by means of hinging means, said horizontal steering bar being in turn hinged to a steering column at an intermediate point between said two ends so as to oscillate with respect to said steering column about a first rotation axis substantially orthogonal to a rolling plane of the two front wheels defined by said kinematic rolling mechanism,
- b) providing releasable means to reversibly block a lying position of said steering bar with respect to a vertical projection plane, which is transverse to a centreline plane of the motor vehicle,
- c) activating said releasable means in such a way that said steering bar is prevented from changing its lying position with respect to said vertical projection plane so as to constrain the relative position between the two axle journals, and thus block the rolling movements of the two front wheels; and
- d) deactivating said releasable means in such a way that said steering bar is free to change its lying position with respect to said vertical projection plane so as to passively follow the movements of said two front wheels with respect to each other and to the frame without interfering with said two front wheels except to control the steering and thus free the rolling movements of the two front wheels.

* * * * *